(12) United States Patent
Digman et al.

(10) Patent No.: US 12,420,591 B2
(45) Date of Patent: Sep. 23, 2025

(54) TIRE TREAD

(71) Applicant: The Goodyear Tire & Rubber Company, Akron, OH (US)

(72) Inventors: Brian David Digman, Sagamore Hills, OH (US); Brett Alan Bogner, Clinton, OH (US); Jonathan Robert Luke, North Canton, OH (US); Jeremy Lee Roberts, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/308,192

(22) Filed: May 5, 2021

(65) Prior Publication Data

US 2022/0355622 A1   Nov. 10, 2022

(51) Int. Cl.
  B60C 11/03 (2006.01)
  B60C 11/12 (2006.01)

(52) U.S. Cl.
  CPC ...... B60C 11/0309 (2013.01); B60C 11/0306 (2013.01); B60C 11/1204 (2013.01); B60C 11/1236 (2013.01); B60C 2011/0348 (2013.01); B60C 2011/0381 (2013.01); B60C 2011/1213 (2013.01); B60C 2011/1254 (2013.01)

(58) Field of Classification Search
  CPC ............ B60C 11/0306; B60C 11/1204; B60C 11/1236; B60C 2011/0348; B60C 2011/0381; B60C 2011/1213; B60C 2011/1254; B60C 11/032; B60C 2011/0374

USPC ................................................. D12/559, 594
  See application file for complete search history.

(56) References Cited

U.S. PATENT DOCUMENTS

| | | | |
|---|---|---|---|
| 5,421,391 A | 6/1995 | Himuro | |
| 5,660,651 A * | 8/1997 | Diensthuber | B60C 11/033 152/DIG. 3 |
| 5,665,184 A | 9/1997 | Fukumoto | |

(Continued)

FOREIGN PATENT DOCUMENTS

| | | |
|---|---|---|
| CN | 103963570 A | 8/2014 |
| EP | 3375643 A1 | 9/2018 |

(Continued)

OTHER PUBLICATIONS

EPO office action dated Sep. 6, 2022.

(Continued)

*Primary Examiner* — Blaine Copenheaver
*Assistant Examiner* — Wendy L Boss
(74) *Attorney, Agent, or Firm* — Eryn Ace Fuhrer; June E. Rickey; Robert N. Lipcsik

(57) ABSTRACT

A tire tread includes a plurality of circumferential grooves, each of the plurality extending continuously in a tire circumferential direction. The plurality of circumferential grooves define a circumferentially extending shoulder rib. The shoulder rib has a plurality of shoulder elements. Each shoulder element is defined by two lateral shoulder grooves. Each shoulder element has an axially outer shoulder element and a corresponding axially adjacent and axially inner shoulder element separated by a circumferential groove. The axially outer shoulder elements each have a pair of angled outer lateral S-shaped blind grooves extending axially away from the inner shoulder elements.

5 Claims, 4 Drawing Sheets

(56) References Cited

U.S. PATENT DOCUMENTS

| | | | |
|---|---|---|---|
| 5,833,780 A | 11/1998 | Kishi et al. | |
| 5,891,276 A | 4/1999 | Takahashi | |
| 5,954,107 A * | 9/1999 | Kuze | B60C 11/0306 |
| | | | 152/209.28 |
| 6,000,450 A | 12/1999 | Kishimoto et al. | |
| 6,006,804 A | 12/1999 | Yokota | |
| 6,102,092 A | 8/2000 | Radulescu | |
| 6,467,517 B1 | 10/2002 | Radulescu | |
| 6,736,175 B2 | 5/2004 | Carra et al. | |
| 7,347,238 B2 | 3/2008 | Miyasaka | |
| 7,581,574 B2 | 9/2009 | Shirouzu | |
| 7,607,464 B2 | 10/2009 | Murata | |
| D610,068 S | 2/2010 | Nagata | |
| 8,210,219 B2 | 7/2012 | Iwai | |
| 8,881,781 B2 | 11/2014 | Ookawara et al. | |
| 9,688,106 B2 | 6/2017 | Pialot | |
| 9,744,810 B2 | 8/2017 | Sueno | |
| D937,187 S * | 11/2021 | Digman | D12/594 |
| D944,187 S * | 2/2022 | Digman | D12/594 |
| 2001/0035244 A1* | 11/2001 | Diensthuber | B60C 11/11 |
| | | | 152/209.16 |
| 2002/0092591 A1* | 7/2002 | Cortes | B60C 11/0309 |
| | | | 152/209.16 |
| 2012/0037287 A1 | 2/2012 | Atake et al. | |
| 2012/0118455 A1* | 5/2012 | Hada | B60C 11/0304 |
| | | | 152/209.8 |
| 2013/0014872 A1 | 1/2013 | Dautrey et al. | |
| 2014/0209225 A1 | 7/2014 | Kuroda | |
| 2014/0360639 A1 | 12/2014 | Fujioka | |
| 2017/0368883 A1* | 12/2017 | Kigami | B60C 11/0302 |
| 2018/0072104 A1* | 3/2018 | Jin | B60C 11/1218 |
| 2018/0086147 A1* | 3/2018 | Morii | B60C 11/12 |
| 2018/0297416 A1 | 10/2018 | Ninomiya | |
| 2018/0345731 A1* | 12/2018 | Oda | B60C 11/033 |
| 2019/0263186 A1 | 8/2019 | Vaissaud et al. | |
| 2019/0308463 A1* | 10/2019 | Nagase | B60C 11/0306 |
| 2020/0298627 A1 | 9/2020 | Fujioka | |
| 2023/0031908 A1* | 2/2023 | Kajiyama | B60C 11/1204 |

FOREIGN PATENT DOCUMENTS

| | | |
|---|---|---|
| JP | H0443104 A | 4/1992 |
| JP | H07290908 A | 11/1995 |
| JP | 2007216871 A | 8/2007 |
| JP | 2009149124 | 7/2009 |
| JP | 2019131152 A | 8/2019 |
| JP | 2019151151 A | 9/2019 |
| RU | 20485 U1 | 11/2001 |

OTHER PUBLICATIONS

Translation of Chinese Search report for Serial No. 202210480729.8 mailed on Mar. 6, 2024.
China Patent Search Report for Serial No. 202210480729.8 mailed on Dec. 18, 2024.

* cited by examiner

TIRE TREAD

FIELD OF THE INVENTION

The present invention relates to a pneumatic tire that exhibits excellent snow performance while maintaining other performance characteristics.

BACKGROUND OF THE PRESENT INVENTION

Conventionally, in addition to circumferential main grooves and lateral grooves, pneumatic tire treads may have circumferential and lateral sipes on a tread surface in order to demonstrate favorable functional characteristics (e.g., snow traction, noise generation, rolling resistance, dry traction, durability, etc.).

SUMMARY OF THE INVENTION

A first tire tread in accordance with the present invention includes a plurality of circumferential grooves, each of the plurality extending continuously in a tire circumferential direction. The plurality of circumferential grooves define a circumferentially extending shoulder rib. The shoulder rib has a plurality of shoulder elements. Each shoulder element is defined by two lateral shoulder grooves. Each shoulder element has an axially outer shoulder element and a corresponding axially adjacent and axially inner shoulder element separated by a circumferential groove. The axially outer shoulder elements each have a pair of angled outer lateral S-shaped blind grooves extending axially away from the inner shoulder elements.

According to another aspect of the first tire tread, each of the outer lateral S-shaped blind grooves has a straight circumferential sipe extending circumferentially to a lateral shoulder groove.

According to still another aspect of the first tire tread, each of the axially inner shoulder elements has two spaced apart inner lateral S-shaped blind grooves extending axially outward from one of the circumferential grooves.

According to yet another aspect of the first tire tread, each inner lateral S-shaped blind groove has a straight circumferential sipe extending circumferentially to the lateral shoulder groove.

According to still another aspect of the first tire tread, the axial widths of the circumferential grooves narrow as the circumferential grooves extend radially inward.

A second tire tread in accordance with the present invention includes a plurality of circumferential grooves. Each of the plurality extending continuously in a tire circumferential direction. The plurality of circumferential grooves define two circumferentially extending shoulder ribs. The shoulder ribs each has a plurality of shoulder elements. Each shoulder element is defined by two lateral shoulder grooves. Each shoulder element has an axially outer shoulder element and a corresponding axially adjacent and axially inner shoulder element separated by a circumferential groove. The axially outer shoulder elements each have a pair of outer lateral S-shaped grooves extending axially away from the inner shoulder elements.

According to another aspect of the second tire tread, each of the outer lateral S-shaped grooves has a straight circumferential sipe extending circumferentially to a lateral shoulder groove.

According to still another aspect of the second tire tread, each of the axially inner shoulder elements has two spaced apart inner lateral S-shaped grooves extending axially outward from one of the circumferential grooves.

According to yet another aspect of the second tire tread, each inner lateral S-shaped blind groove has a straight circumferential sipe extending circumferentially to the lateral shoulder groove.

According to still another aspect of the second tire tread, the axial widths of the circumferential grooves narrow as the circumferential grooves extend radially inward.

A third tread for a tire in accordance with the present invention includes a plurality of circumferential grooves. Each of the plurality extends in a tire circumferential direction. The plurality of circumferential grooves define a circumferentially extending shoulder rib. The shoulder rib has a plurality of shoulder elements. Each shoulder element is defined by two lateral shoulder grooves. Each shoulder element has an axially outer shoulder element and a corresponding axially adjacent and axially inner shoulder element separated by a circumferential groove. The axially outer shoulder elements each have a pair of angled outer lateral S-shaped blind grooves extending axially away from the inner shoulder elements. One of the axially inner shoulder elements defines two spaced apart L-shaped grooves extending axially and circumferentially. The L-shaped grooves have a straight portion extending circumferentially to a lateral shoulder groove.

According to another aspect of the third tread, each S-shaped blind groove has a straight portion extending circumferentially to the lateral shoulder groove.

According to still another aspect of the third tread, each of the outer lateral S-shaped blind grooves has a straight circumferential sipe extending circumferentially to the lateral shoulder groove.

According to yet another aspect of the third tread, another of the axially inner shoulder elements has two spaced apart inner lateral S-shaped blind grooves extending axially outward from one of the circumferential grooves.

According to still another aspect of the third tread, the inner lateral S-shaped blind groove has a straight circumferential sipe extending circumferentially to the lateral shoulder groove.

According to yet another aspect of the third tread, the axial widths of the circumferential grooves narrow as the circumferential grooves extend radially inward.

BRIEF DESCRIPTION OF THE DRAWINGS

A more complete appreciation of the present invention and many of the attendant advantages thereof will be readily ascertained as the same becomes better understood by reference to the following detailed description when considered in connection with the accompanying drawings, wherein.

DETAILED DESCRIPTION OF THE EXAMPLES OF THE PRESENT INVENTION

Figure 1:
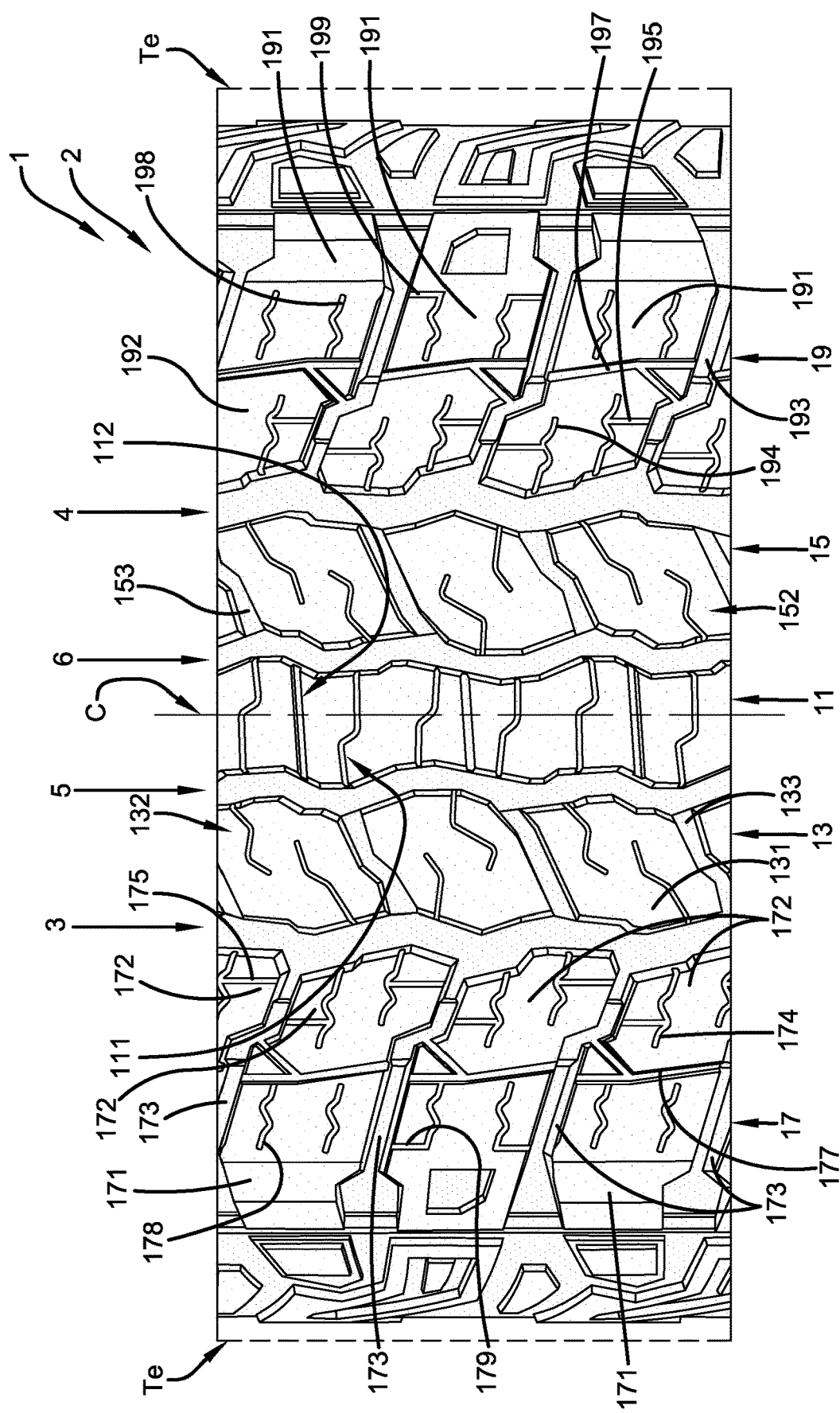
FIG. 1 schematically shows an enlarged orthogonal front view of an example tire tread in accordance with the present invention.

Examples of the present invention may be below described with reference to the accompanying drawings, wherein like reference numerals designate corresponding and/or identical elements throughout FIGS. 1-4.

Figure 2:
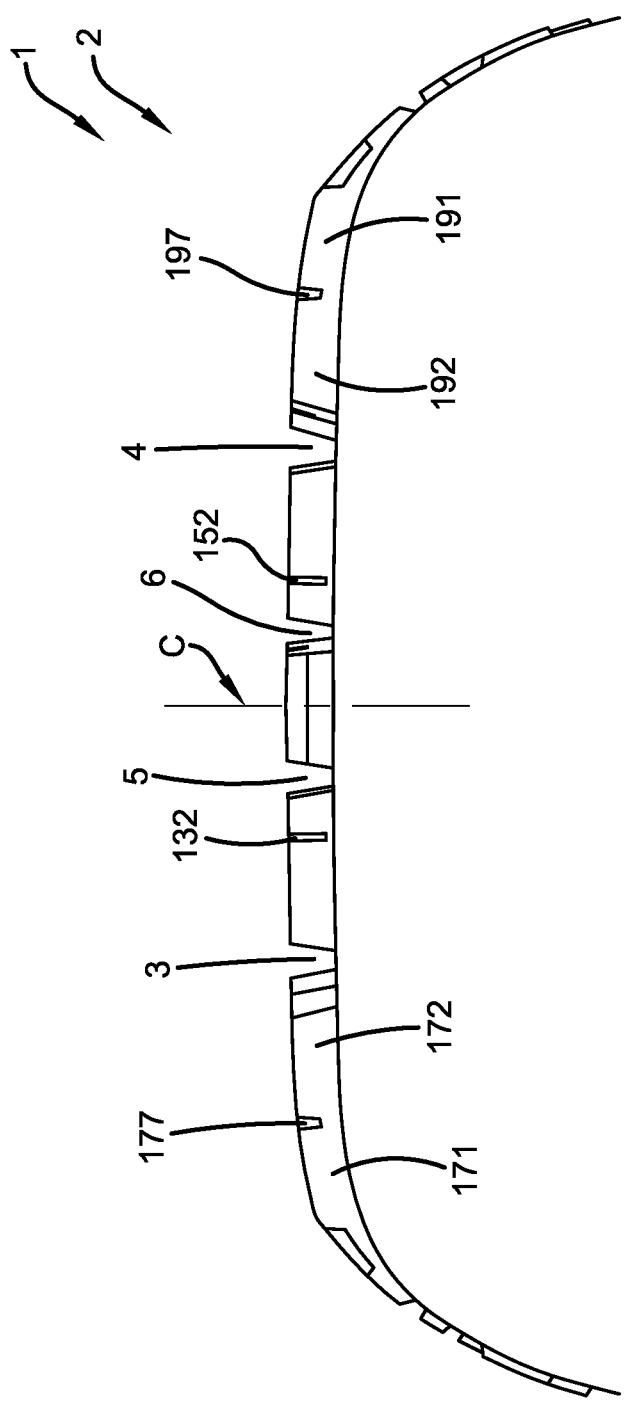
FIG. 2 schematically shows a section view of part of the tire tread of FIG. 1.

As shown in FIGS. 1-2, an example non-pneumatic or pneumatic tire 1 according to the present invention (hereinafter may be referred to simply as "tire") may be a tire mounted in a designated direction on a vehicle. The right side of the tire 1 in FIG. 1 may be set as the outer side when it is mounted on a vehicle with the left side in FIG. 1 being the inner side. The tire 1 may be asymmetrical about a tire equator C. The tire 1 may be used for a passenger car, for example.

Figure 3:
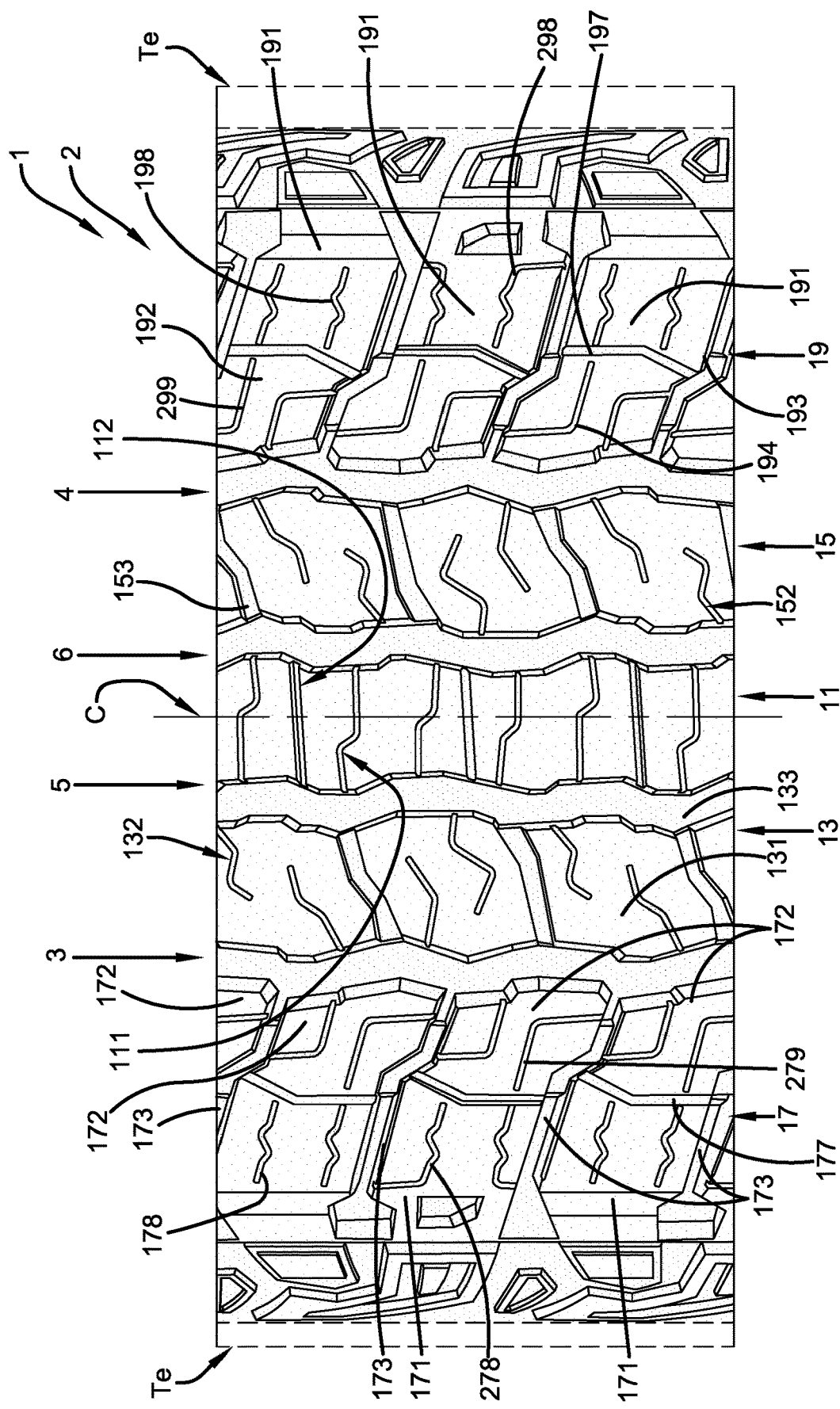
FIG. 3 schematically shows an enlarged orthogonal front view of another example tire tread in accordance with the present invention.

A tread 2 of the tire 1 may have a pair of shoulder grooves 3, 4 and a pair of intermediate grooves 5, 6 (FIGS. 1 & 3). The shoulder grooves 3, 4 may be positioned on each side of tire equator C and closest to either footprint edge Te, Te extending continuously in a circumferential direction. The shoulder and intermediate grooves 3, 4, 5, 6 may extend circumferentially and linearly in a substantially straight line at a substantially constant groove width.

The grooves 3, 4, 5, 6 may define five circumferentially extending ribs: a center rib 11, a pair of intermediate ribs 13, 15, and a pair of shoulder ribs 17, 19. Each rib 11, 13, 15, 17, 19 may be spaced from an axially adjacent rib by the circumferentially continuous grooves 3, 4, 5, 6.

The tread elements 131 of the first intermediate rib 13, separated by lateral intermediate grooves 133, may define a circumferential array of spaced apart angled lateral blind grooves 132 extending from the first shoulder groove 3 and toward the first intermediate groove 5. The continuous center rib 11 may have a circumferential array of alternating lateral straight grooves 112 and lateral S-shaped grooves 111 extending from the first intermediate groove 5 to the second intermediate groove 6. The tread elements 152 of the second intermediate rib 15, separated by lateral intermediate grooves 153, may define a circumferential array of spaced apart angled lateral blind grooves 152 extending toward the second intermediate groove 6 and toward the second shoulder groove 4.

The first shoulder rib 17 may include a plurality of axially outer shoulder elements 171 and corresponding axially adjacent and axially inner shoulder elements 172. The axially outer shoulder elements 171 and axially inner shoulder elements 172 may be axially separated by circumferential grooves 177. The outer shoulder elements 171 may extend axially outward to and over the tread edge Te and be circumferentially separated by lateral shoulder grooves 173. The axially outer shoulder elements 171 may each have a pair of angled lateral S-shaped blind grooves 178 extending axially away from the inner shoulder elements 172. Any or all of the S-shaped blinds grooves 178 may have a straight circumferential sipe 179 extending circumferentially to one of the lateral shoulder grooves 173.

The axially inner shoulder elements 172, also circumferentially separated by the lateral shoulder grooves 173, may each define two spaced apart angled lateral S-shaped blind grooves 174 extending axially outward from the first shoulder groove 3. The S-shaped blind grooves 174 may each have a straight circumferential sipe 175 extending circumferentially to one of the lateral shoulder grooves 173.

The second shoulder rib 19 may include a plurality of axially outer shoulder elements 191 and corresponding axially adjacent and axially inner shoulder elements 192. The axially outer shoulder elements 191 and axially inner shoulder elements 192 may be axially separated by circumferential grooves 197. The outer shoulder elements 191 may extend axially outward to and over the tread edge Te and be circumferentially separated by lateral shoulder grooves 193. The axially outer shoulder elements 191 may each have a pair of angled lateral S-shaped blind grooves 198 extending axially away from the inner shoulder elements 192. Any or all of the S-shaped blinds grooves 198 may have a straight circumferential sipe 199 extending circumferentially to one of the lateral shoulder grooves 193, similar to the circumferential sipes 179 of the first shoulder rib 17.

The axially inner shoulder elements 192, also circumferentially separated by the lateral shoulder grooves 193, may each define two spaced apart angled lateral S-shaped blind grooves 194 extending axially outward from the second shoulder groove 4. The S-shaped blind grooves 194 may each have a straight circumferential sipe 195 extending circumferentially to one of the lateral shoulder grooves 193.

Figure 4:
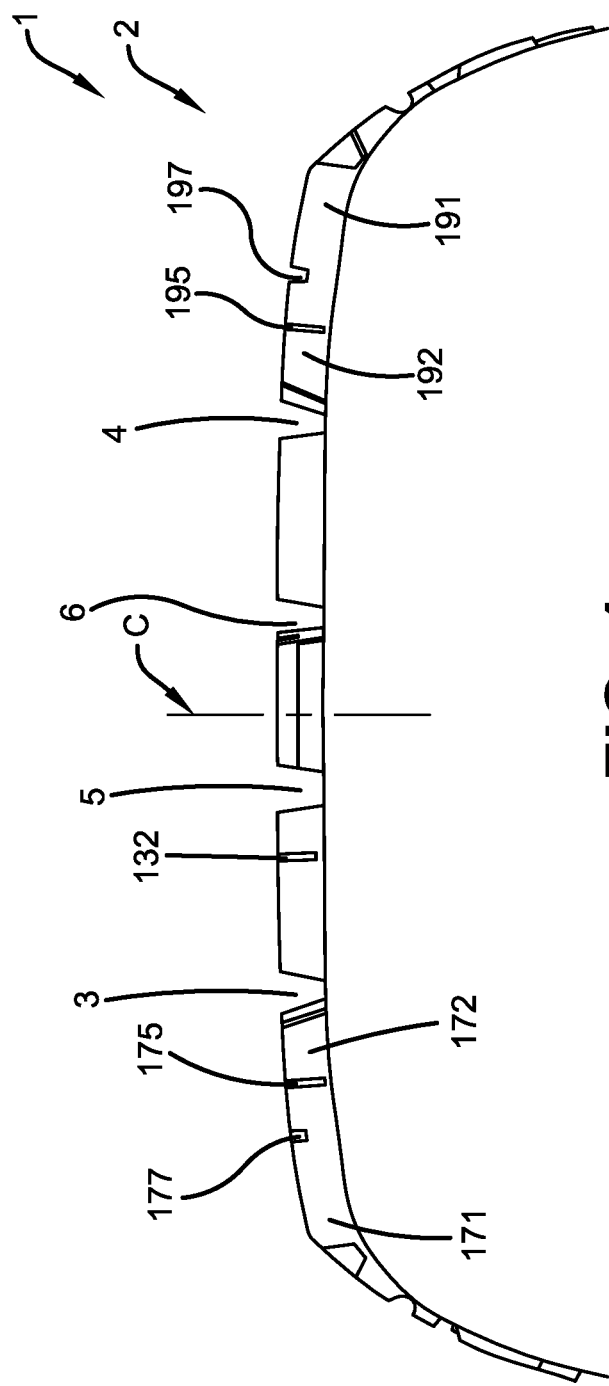
FIG. 4 schematically shows a section view of part of the tire tread of FIG. 3.

As shown in FIGS. 3-4, another example non-pneumatic or pneumatic tire 1 according to the present invention (hereinafter may be referred to simply as "tire") may be a tire mounted in a designated direction on a vehicle. The right side of the tire 1 in FIG. 3 may be set as the outer side when it is mounted on a vehicle with the left side in FIG. 3 being the inner side. The tire 1 may be asymmetrical about a tire equator C. The tire 1 may be used for a passenger car, for example.

As in FIGS. 1-2, the axially outer shoulder elements 171 of FIGS. 3-4 may have a pair of angled lateral S-shaped blind grooves 178 extending axially away from the inner shoulder elements 172. Any or all of the S-shaped blinds grooves may form and an L-shaped sipe 278 with a straight portion extending circumferentially to one of the lateral shoulder grooves 173. The axially inner shoulder elements 172, also circumferentially separated by the lateral shoulder grooves 173, may each define two spaced apart L-shaped grooves 279 extending axially and circumferentially. The L-shaped grooves 278 may each have a straight portion extending circumferentially to one of the lateral shoulder grooves 173.

Again, as in FIGS. 1-2, the axially outer shoulder elements 191 of FIGS. 3-4 may have a pair of angled lateral S-shaped blind grooves 198 extending axially away from the inner shoulder elements 192. Any or all of the S-shaped blinds grooves may form and L-shaped sipe 298 with a straight portion extending circumferentially to one of the lateral shoulder grooves 193. The axially inner shoulder elements 192, also circumferentially separated by the lateral shoulder grooves 193, may each define two spaced apart L-shaped grooves 299 extending axially and circumferentially. The L-shaped grooves 298 may each have a straight portion extending circumferentially to one of the lateral shoulder grooves 173.

So far, a tire according to the present invention has been described in detail. However, the present invention is not limited to the above examples, and various modifications of the example may also apply. Numerous modifications and variations of the present invention are possible in light of the above teachings. It is therefore to be understood that within the scope of the appended claims, the present invention may be practiced otherwise than as specifically and exemplarily described herein.

What is claimed:

1. A tire comprises:
   a tread having a plurality of grooves, each of the plurality of grooves extending continuously in a tire circumferential direction,
   a circumferentially extending shoulder rib, the shoulder rib having a plurality of shoulder elements, each shoulder element being defined by two lateral shoulder grooves, each shoulder element having an axially outer portion and a axially inner portion separated by a circumferential groove, wherein the circumferential groove has a straight portion connected to a V shaped portion, the axially outer portions each having one or more S-shaped blind grooves extending in the axial direction, wherein each of the S-shaped blind grooves have a straight circumferential sipe extending circumferentially to an adjacent lateral shoulder groove, wherein each of the axially inner portions have two spaced apart lateral S-shaped blind grooves extending axially outward from one of the circumferential grooves.

2. The tire tread of claim 1 wherein each lateral S-shaped blind groove has a straight circumferential sipe extending circumferentially to the lateral shoulder groove.

3. The tire tread of claim 1 wherein axial widths of the circumferential grooves narrow as the circumferential grooves extend radially inward.

4. A tire tread comprises:
   a plurality of circumferential grooves, each of the plurality extending continuously in a tire circumferential direction,
   the plurality of circumferential grooves defining two circumferentially extending shoulder ribs, the shoulder ribs each having a plurality of shoulder elements, each shoulder element being defined by two lateral shoulder grooves, each shoulder element having an axially outer portion and a corresponding axially adjacent and axially inner portion separated by a Y shaped circumferential groove, wherein the Y shaped circumferential groove extends from a first circumferential end to a second circumferential end of the shoulder element, the axially outer portions each having a pair of S-shaped grooves extending in the axial direction away from the inner portions, wherein each of the S-shaped grooves are connected to a straight circumferential sipe extending circumferentially to a lateral shoulder groove, wherein each of the axially inner portions have two lateral S-shaped grooves extending axially outward from one of the circumferential grooves, wherein each lateral S-shaped groove has a straight circumferential sipe extending circumferentially to the lateral shoulder groove.

5. The tire tread of claim 4 wherein axial widths of the circumferential grooves narrow as the circumferential grooves extend radially inward.

\* \* \* \* \*